US010331535B1

(12) United States Patent
Liao

(10) Patent No.: US 10,331,535 B1
(45) Date of Patent: Jun. 25, 2019

(54) DETECTING DISCREPANCY IN MOBILE EVENT TRACKING NETWORK

(71) Applicant: AppiSocial Co., Ltd., Taipei (TW)

(72) Inventor: En-Yi Liao, Santa Clara, CA (US)

(73) Assignee: AppiSocial Co., Ltd., Taipei (TW)

( * ) Notice: Subject to any disclaimer, the term of this patent is extended or adjusted under 35 U.S.C. 154(b) by 169 days.

(21) Appl. No.: 15/614,516

(22) Filed: Jun. 5, 2017

(51) Int. Cl.
*G06F 21/56* (2013.01)
*G06F 11/30* (2006.01)
*H04L 29/06* (2006.01)

(52) U.S. Cl.
CPC ...... *G06F 11/3072* (2013.01); *G06F 11/3065* (2013.01); *G06F 21/566* (2013.01); *G06F 11/302* (2013.01); *G06F 2221/033* (2013.01); *H04L 63/14* (2013.01)

(58) Field of Classification Search
CPC ............. G06F 11/3072; G06F 11/3065; G06F 21/566; G06F 11/302; G06F 2221/033; H04L 63/14
See application file for complete search history.

(56) References Cited

U.S. PATENT DOCUMENTS

| | | | | |
|---|---|---|---|---|
| 8,819,819 B1* | 8/2014 | Johnston | ................. | G06F 21/53 709/206 |
| 2008/0082662 A1* | 4/2008 | Dandliker | ............... | H04L 63/10 709/225 |
| 2008/0109473 A1* | 5/2008 | Dixon | .................... | G06Q 10/06 |
| 2011/0030060 A1* | 2/2011 | Kejriwal | ............... | G06F 21/566 726/25 |
| 2011/0283356 A1* | 11/2011 | Fly | ........................ | G06F 21/577 726/22 |
| 2011/0289582 A1* | 11/2011 | Kejriwal | ............... | G06F 21/566 726/22 |
| 2013/0145463 A1* | 6/2013 | Ghosh | .................... | G06F 21/56 726/22 |
| 2013/0247179 A1* | 9/2013 | Chandran | ............. | G06F 21/567 726/22 |
| 2015/0373015 A1* | 12/2015 | Mary | ...................... | G06F 21/44 726/9 |
| 2015/0381621 A1* | 12/2015 | Innes | ...................... | G06F 21/31 726/7 |
| 2016/0110775 A1* | 4/2016 | Moiz | .................. | G06Q 30/0277 705/14.73 |
| 2018/0324064 A1* | 11/2018 | Tola | .................... | H04L 67/1097 |

* cited by examiner

*Primary Examiner* — Joseph P Hirl
*Assistant Examiner* — Stephen T Gundry
(74) *Attorney, Agent, or Firm* — Fenwick & West LLP

(57) ABSTRACT

A computer system identifies event discrepancies in an event tracking network. For a given event track-able content, the computer system identifies the event tracking system from its tracking URL. The computer system retrieves an event report from the event tracking system. The computer system also retrieves event postback messages from the content publisher and generates the event discrepancy report by comparing the data in the event report with the event postback messages.

20 Claims, 14 Drawing Sheets

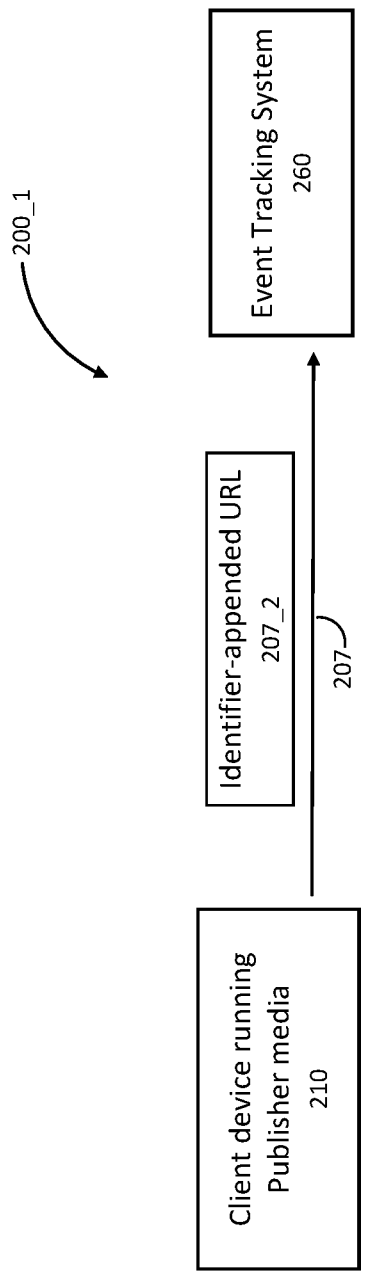

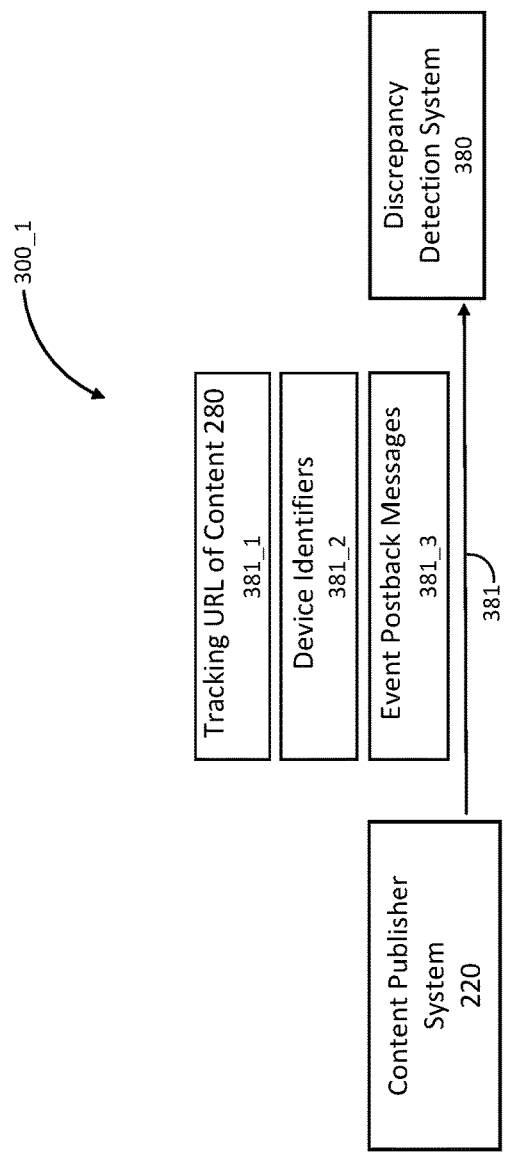

DETECTING DISCREPANCY IN MOBILE EVENT TRACKING NETWORK

FIELD OF THE INVENTION

The present invention relates generally to the digital content tracking, and more particularly to discrepancy detection in a mobile event tracking network.

DESCRIPTION OF THE BACKGROUND ART

Content providers generate content and provide the generated content to content publishers for providing to users via client devices, for example, mobile devices. The content can be a text, image, video, etc. A content provider may generate a tracking URL for a piece of content. The content provider provides the tracking URL along with the content to the content publisher for publishing. Certain systems, referred to as event tracking systems or event trackers, track events associated with the mobile device that are related to the content item, for example, events representing a user interaction performed using the mobile device with a repository service associated with the content. An example of a repository service is a service that allows users to download binary data, for example, executable applications to a client device. In response to certain events, an event tracking system sends an event postback message to the content publisher. Examples of events include a user launching an application that was downloaded on the client device. The event postback message allows the content publisher to track mobile events associated with the content published by the content publisher.

Often multiple systems are involved in the tracking of events associated with the content. For example, multiple servers may redirect a request received by a mobile device. Tracking events in such systems can be complex. For example, multiple systems involved create a cascaded event tracking and postback hierarchy. Tracking events using such cascaded mobile tracking hierarchy can be error-prone and the event postback message can get lost in the hierarchy. Events may get lost during tracking due to system/server errors or due to malicious servers, resulting in loss of information. Conventional techniques are unable to detect if there is loss of information during event tracking and which systems are causing the loss.

SUMMARY

In one embodiment, a computer system identifies event discrepancies associated with content provided by a content publishing system to client devices. The computer system receives a request to identify event discrepancies associated with a content item. The computer system receives a tracking URL associated with the content item. The tracking URL is provided by the content publisher system to a client device and causes the client device to be redirected via one or more systems to a repository service. The client device performs user interactions of a particular type, for example, launching a downloaded application for the first time after the application was downloaded. The client device reports these user interactions as events to an event tracking system.

The computer system identifies the event tracking system associated with the content item from its tracking URL, retrieves an event report from the event tracking system. The event report identifies client devices that performed user interactions of the particular type. The computer system also retrieves information describing event postback messages from the content publisher system. The computer system identifies event discrepancies by comparing the data in the event report with the event postback messages. The computer system sends information describing the event discrepancies to the requestor.

These and other features will be readily apparent to persons of ordinary skill in the art upon reading the entirety of this disclosure, which includes the accompanying drawings.

DESCRIPTION OF THE DRAWINGS

FIG. 2B shows an example where the publisher identifier is appended in accordance with one embodiment of this invention FIG. 3A schematically shows a computer system 300 in accordance with one embodiment.

DETAILED DESCRIPTION

For simplicity and illustrative purposes, the principles of the embodiments are described by referring mainly to examples thereof. In the present disclosure, numerous specific details are provided, such as examples of apparatus, components, and methods, to provide a thorough understanding of the embodiments. It is apparent that the embodiments may be practiced without limitation to all the specific details. Also, the embodiments may be used together in various combinations.

Being computer-related, it can be appreciated that some components disclosed herein may be implemented in hardware, software, or a combination of hardware and software (e.g. firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented in a single module or separately in multiple modules.

Computer Architecture

Figure 1:
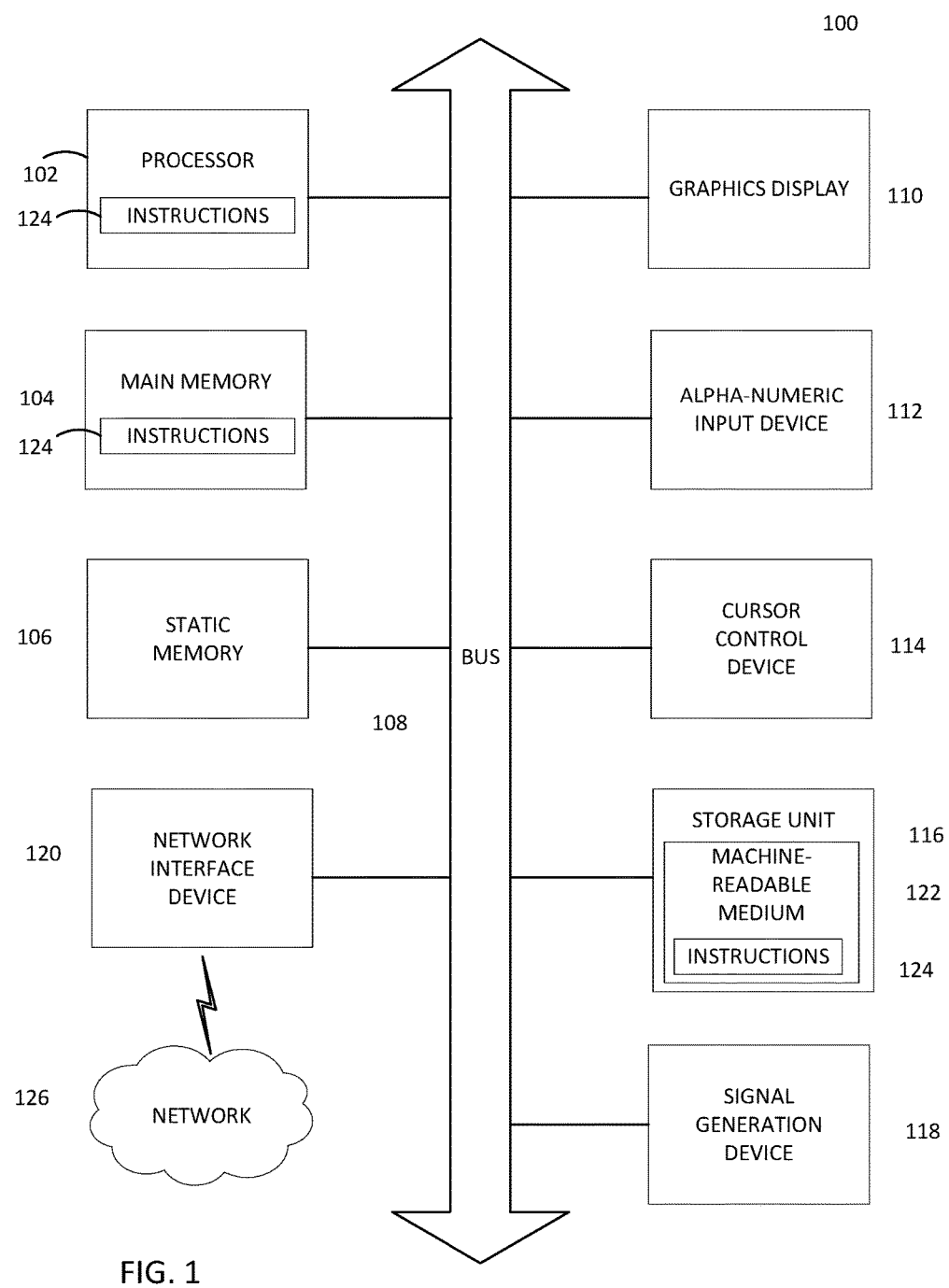
FIG. 1 shows a schematic diagram of an exemplary computer that may be used in embodiments of the present invention.

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Environment

FIG. 2 schematically illustrates event tracking, according to an embodiment. In the example of FIG. 2, a user on client device 210 clicks on the content 280. The content 280 can be a text, image, video, etc. that attracts the user to download and install the app 272. The content 280 is served from the content publisher system 220. A content publisher system 220 is also referred to herein as a content publishing server 220. The content publishing system 220 may comprise one or more computer processors.

The act of clicking the content 280 causes the client device 210 to access the tracking URL of the content that may be configured to open a URL connection in path 201 to the content publisher system 220. Responsive to accessing the tracking URL, the client device 210 may access a sequence of redirect URLs that cause the client device 210 to access one or more content tracking systems 230, an event tracking system 260, and a repository service 270. (A letter after a reference numeral, such as "230(*a*)," indicates that the text refers specifically to the element having that particular reference numeral, while a reference numeral in the text without a following letter, such as "230," refers to any or all of the elements in the figures bearing that reference numeral.)

The repository service 270 stores certain type of data and allows users to access the data. Accordingly, the repository service 270 allows users to perform certain types of user interactions via client device. These user interactions may be performed by users via client devices with the data downloaded from the repository service 270. These user interactions are performed responsive to accessing the tracking URL of a content received by the client device from a content publishing system. In an embodiment, the repository service 270 implements an application repository that allows client devices 210 to download applications represented as files storing executable code. In another embodiment, the repository service 270 implements any repository that allows client devices 210 to download data represented as files. The user may perform user interactions such as launching (or installing) a downloaded application for the first time since the application was downloaded or performing an in-application purchase.

In an embodiment, the repository service 270 is a website that stores web pages or stores various content items such as images, videos, and text and dynamically generates web pages that are received by a client device of a user. Such a repository allow users to perform user interactions, for example, execute transactions such as purchases, register with the website, and so on.

The client device executes instructions that send information describing these user interactions as events to the event tracking system 260. These instructions may be included in the executable binary data downloaded by the client device. Accordingly, when an application downloaded from the repository service is launched for the first time, instructions are executed that cause the event of launching of the application to be reported to the event tracking system. In some embodiments, these instructions may be executed by a web page downloaded by the client device. For example, these instructions may be part of a script code such as JAVASCRIPT code included in the web page downloaded by the client device.

The tracking URL may include URL parameters contain identifiers such as a content Id, or device IDs that uniquely identify the device on which the content 280 was clicked. Examples of device IDs stored on the device include, a GOOGLE advertising ID, IDFA, and click ID. This allows the content publisher system 220 to keep a record of every mobile device on which the content 280 was clicked. Examples of mobile devices include smart phones such as IPHONEs and ANDROID phones, tablets, laptops, and so on. The content publisher system 220 logs the URL parameters from step 201 and returns a redirect URL in path 202 to the mobile device 210.

The client device 210 automatically opens a URL connection in path 203 using the redirect URL from path 202 and connects to content tracking system 230(b). The URL parameters may contain identifiers such as a content Id and a device ID. In addition to that, the parameters may contain an identifier that identifies the content publisher system 220, which the content tracking system 230(b) uses to send the event postback message. The content tracking system 230(b) may record the URL parameters from path 203 and return a redirect URL in path 204.

The client device 210 automatically opens a URL connection in path 205 using the redirect URL from path 204 and connects to content tracking system 230(a). The URL parameters may contain said identifiers and publisher identifier for content tracking system 230(b). With these identifiers, the content tracking system 230(a) knows the address to which the event postback message needs to be sent. The content tracking system 230(a) may record the URL parameters from path 205 and returns a redirect URL in path 206.

The client device 210 automatically opens a URL connection in path 207 using the redirect URL from path 206 and connects to the event tracking system 260. An event tracking system may also be referred to herein as an event tracker or an event tracking server. With said identifiers and publisher identifier for the content tracking system 230(a), the event tracking system 260 knows who to send the event postback message when necessary. The event tracking system 260 may record the URL parameters from path 207 and returns a redirect URL to the repository service 270 in path 208.

The client device 210 connects to the repository service 270 using the redirect URL from path 208 that opens the app 272 landing page in path 211. The app 272 may be downloaded from the repository service 270 as the downloaded app 273. After being downloaded, the app may be installed, and launched on client device 210 in path 212. A client device may also be referred to herein as a mobile device.

In the example of FIG. 2, the app 272 is pre-configured so that it reports events (such as first launch, in-app activities events) back to the event tracking system 260 in path 213. An event may contain the app identifier for the app 272, device identifiers, and other identifiers associated with the event. The event tracking system 260 may implement various ID matching methods to determine the various entities that contributed to the event.

In the example of FIG. 2, the event tracking system 260 determines that the event was contributed by the content tracking system 230(a) and sends an event postback message in path 214 to the content tracking system 230(a). The event postback message in path 214 may contain the app identifier for the app 272, device identifiers, and other identifiers associated with the event. The content tracking system 230(a) may use these identifiers to determine the event was contributed by the content tracking system 230(b) and sends an event postback message in path 215 to the content tracking system 230(b).

The event postback message in path 215 may contain the app identifier for the app 272, device identifiers, and other identifiers associated with the event. The content tracking system 230(b) may use these identifiers to identify that the event was contributed by the content publisher system 220 and sends an event postback message in path 216 to the content publisher system 220.

In the example of FIG. 2, the event postback message goes one way from the event tracking system 260, to the content tracking system 230(a), to the content tracking system 230(b), and to the content publisher system 220. It is an inherent weakness of this current practice of mobile event tracking that incorrect content tracking setup, system/server errors, or deliberate misconfiguration of any of the servers (260, 240, 230, 220) in the event postback message hierarchy, can result in the loss of event postback messages. The content publisher system 220 cannot receive the event postback message, thus causing an undercount of events and inaccurate business metrics and decisions. When there are more content tracking systems involved in the event tracking hierarchy, the event discrepancy issue can become very complex and difficult to be detected.

Figure 3A:
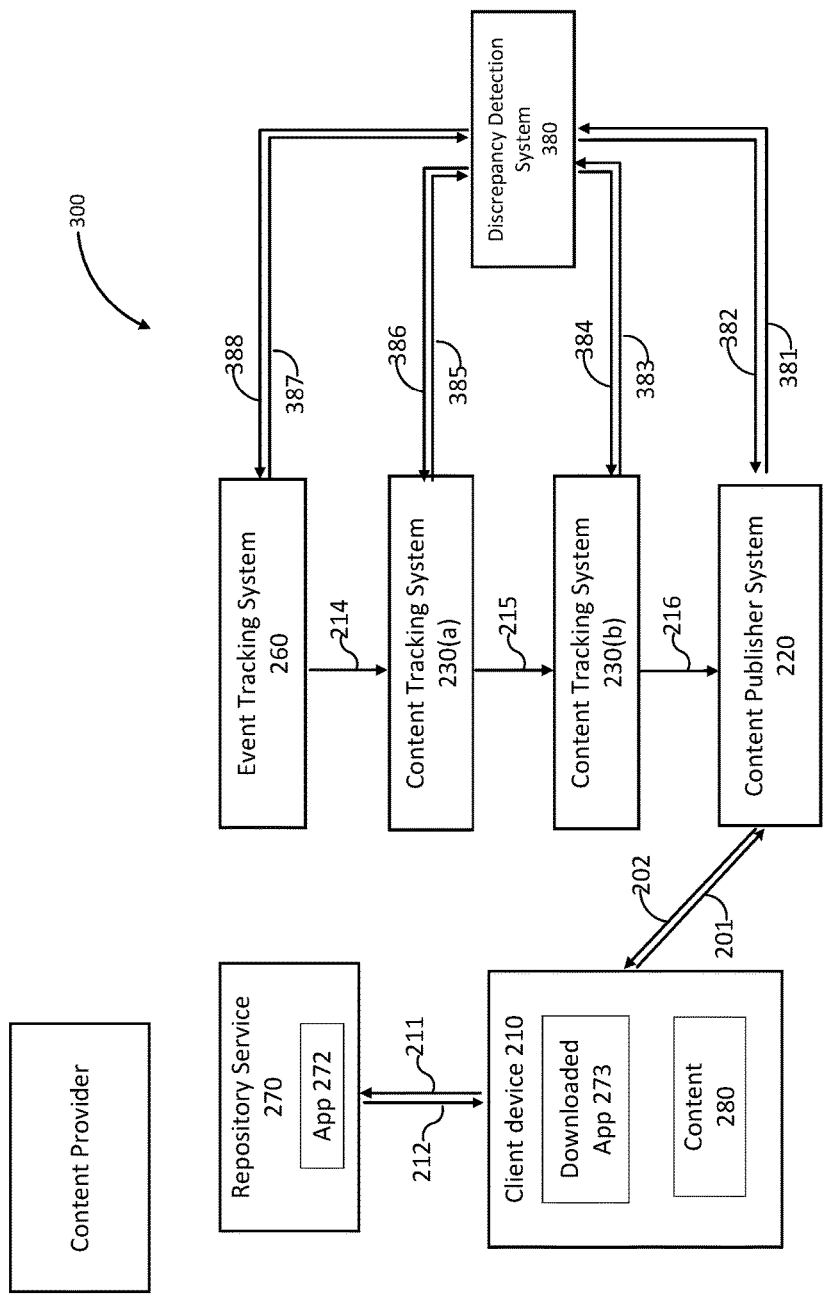
FIG. 3B is a data flow diagram of an exemplary system 300_1 in accordance with one embodiment.
FIG. 3C is a data flow diagram of an exemplary system 300_2 in accordance with one embodiment.

FIG. 3A schematically shows an exemplary computer system 300 in accordance with an embodiment of the present invention. The discrepancy detection system 380 may comprise a server computer for providing the online service to various entities including the content publisher system 220, the content tracking system 230(b), the content tracking system 230(a), and the event tracking system 260. As can be appreciated, the discrepancy detection system 380 may comprise a single computer or a network of computers that cooperatively operate to provide the functionality of the discrepancy detection system 380. An event tracking system may also be referred to herein as a mobile event tracker.

As shown in the example of FIG. 3A, the discrepancy detection system 380 bridges the content publisher system 220 and the event tracking system 260. The discrepancy detection system 380 specifies the scope of the event report by sending the publisher identifier and app identifier to the event tracking system 260 in path 388. The event tracking system 260 sends the specified event report to the discrepancy detection system 380 in path 387. The discrepancy detection system 380 also receives the event postback message from the content publisher system 220 in path 381 and performs the discrepancy calculation to generate the event discrepancy report, which can be provided to the content publisher system 220 in path 382.

FIG. 3B is a data flow diagram of an exemplary system 300_1 in accordance with one embodiment of the present invention. The content publisher system 220 may send the tracking URL 381_1 of the content 280, the device identifiers 381_2, and event postback messages 381_3 to the discrepancy detection system 380 in path 381. The device identifiers 381_2 may contain device identifiers and event time for those devices on which the content 280 is clicked or the app 272 is installed in accordance with an embodiment of the present invention. When the content publisher system 220 receives the event postback message from the content tracking system 230(b) in path 216, the event postback message may be further sent to the discrepancy detection system 380 in path 381 for processing.

After receiving the tracking URL 381_1, the discrepancy detection system 380 may trace the tracking URL 381_1 to determine the event tracking system 260 for the content 280.

Figure 4A:
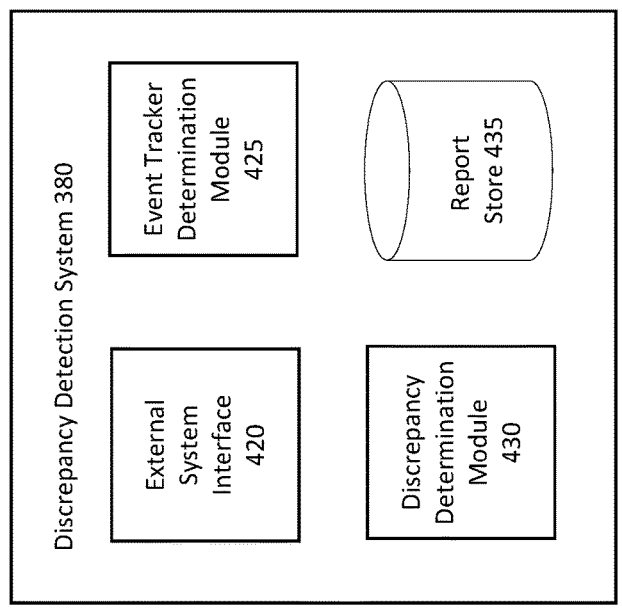
FIG. 4A shows a system architecture of a discrepancy detection system in accordance with an embodiment.

FIG. 4A shows a system architecture of a discrepancy detection system in accordance with an embodiment. The discrepancy detection system 380 comprises an external system interface 420, an event tracker determination module 425, a discrepancy determination module 430, and a report store 435. In other embodiments, the discrepancy detection system 380 may include more or fewer modules. In some embodiments, actions described herein may be implemented by modules other than those indicated herein. The discrepancy detection system 380 may comprise multiple processors and may be a distributed system such that different modules are executing on different computing systems.

The external system interface 420 allows the discrepancy detection system 380 to interact with other systems, for example, with the content publisher system 220, a content tracking system 230, or an event tracking system 260. The external system interface 420 may send a request for data to any external system and receive a response comprising the requested data from the external system. For example, external system interface 420 may send a request for data describing a content item to a content publisher system and receive information including the tracking URL associated with the content item and device identifiers of client devices that accessed the content item.

The event tracker determination module 425 identifies an event tracking system associated with a content item published by a content publisher system. The event tracker determination module 425 identifies the event tracking system associated with a content item based on the tracking URL associated with the content item that is provided to a client device 210. In an embodiment, the event tracker determination module 425 determines a trace path comprising a sequence of redirect URLs that a client device accesses responsive to accessing the tracking URL and determines the identity of the event tracking system based on the redirect URLs as further described herein.

The discrepancy determination module 430 detects discrepancies associated with a content item of the content publishing system. Details of the processes executed by the discrepancy determination module 430 are further described herein, for example, as processes illustrated in FIG. 7A, FIG. 7B, and FIG. 8.

The report store 435 stores data received from various systems as well as data generated by the discrepancy detection system. For example, the report store 435 stores data describing content items received from the content publishing system, event reports received from the event tracking system or content tracking systems, event postback messages, or reports describing event discrepancies generated by the discrepancy determination module 430.

Figure 4B:
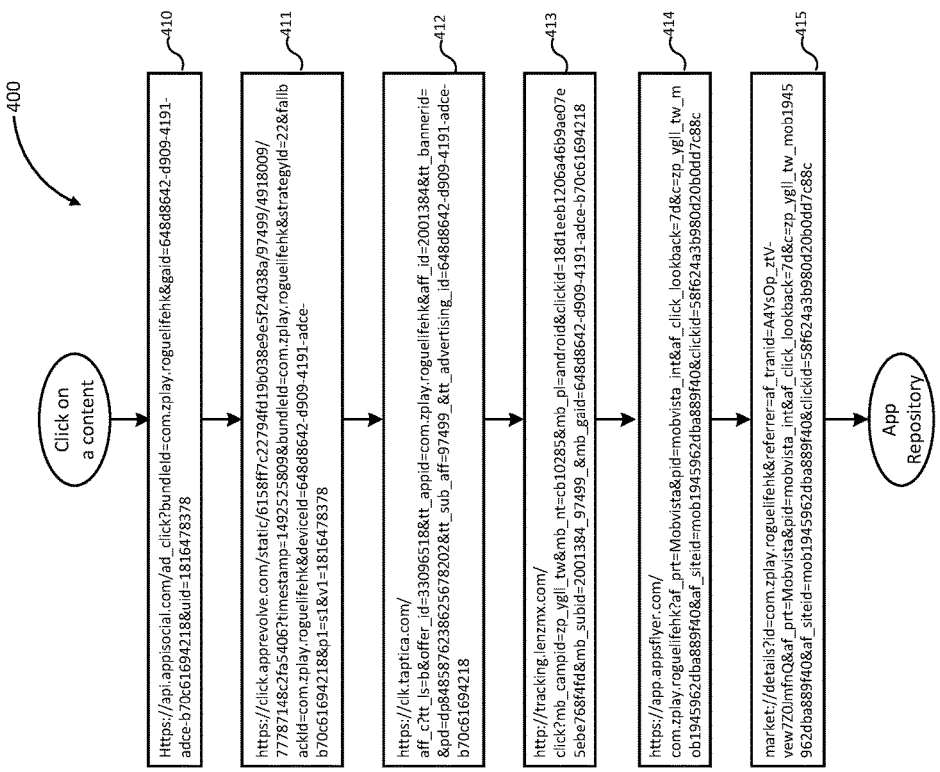
FIG. 4B shows an exemplary URL trace path of a tracking URL.

FIG. 4B shows an exemplary trace path of a tracking URL. The trace path is represented as a sequence of redirect URLs that are encountered by a client device that accesses the tracking URL associated with a content item provided by the content publisher system to the client device. When a user of the client device clicks on a content item, the tracking URL 410 is opened and redirected to URL 411, to URL 412, to URL 413, to URL 414, and to the repository service URL 415.

In the example of FIG. 4B, the URL 410 links to the content publisher system. The URLs 411, 412, and 413 each links to a content tracking system, and the URL 414 links to the mobile event tracking system. In this example, the URL to the mobile event tracker is the URL before the repository service URL (415 in this example). In one embodiment, the mobile event tracking system is identified by examining the URL domain name. By referencing the appropriate documents from the event tracking system, it can be straightforward to identify the publisher identifier, app identifier, and other identifiers in the URL 414. As shown in the example URL 414, the publisher identifier is stored in the pid=parameter which is mobvista_int. The app identifier is com.zplay.roguelifehk. It can be appreciated to know that, in this example, mobvista_int is not the content publisher identifier for the publisher at URL 410. Instead, it is the identifier for the content tracking system at URL 413. However, the content publisher at URL 410 is a downstream publisher of the content tracking system at URL 413, the set of device identifiers in an event report of the content tracking system at URL 413 from the event tracking system at URL 414 should be the super set to the event report for the content publisher at URL 410.

Figure 4C:
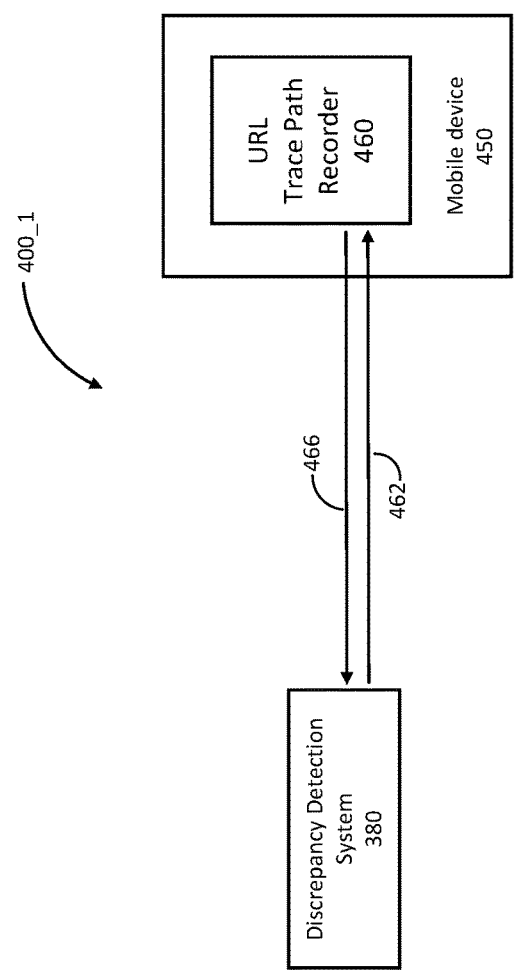
FIG. 4C schematically shows an exemplary computer system 400_1 that determines the trace path for a tracking URL in accordance with an embodiment of the present invention.

FIG. 4C schematically shows an exemplary computer system 400_1 that determines the trace path for a tracking URL in accordance with an embodiment of the present invention. The URL trace path recorder 460 is a mobile application running on the mobile device 450. The discrepancy detection system 380 provides the tracking URLs to the URL trace path recorder 460 in path 462. The URL trace path recorder 460 may use WebView (for example, the WebView class on Android and WKWebView class on iOS) to load the tracking URLs and detect URL redirects that occur while loading the tracking URLs. The URL trace path recorder 460 records the URL redirects as trace paths and sends the trace paths to the discrepancy detection system 380 in path 466. In other embodiments, the trace path recorder 460 module may execute on the discrepancy detection system 380 thereby allowing the discrepancy detection system 380 to determine the trace path without communicating with an external client device.

Returning to FIG. 3A, the discrepancy detection system 380 may send the publisher identifier and app identifier to the event tracking system 260 in path 388 for the purpose of specifying the scope of the event reports. In other embodiments, the discrepancy detection system 380 may further provide information such as geo location, time duration, device identifiers, and other identifiers in path 388 to event tracking system 260, as desired to specify the scope of the event reports.

Figure 3C:
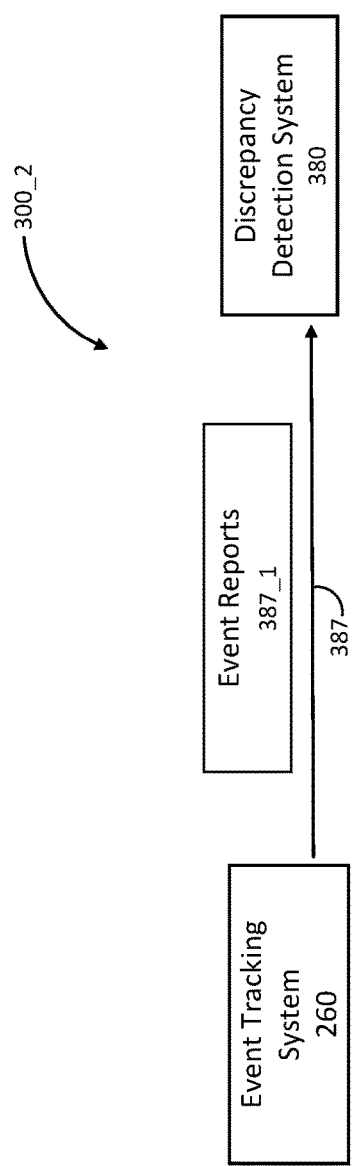

FIG. 3C is a data flow diagram of an exemplary system 300_2 in accordance with an embodiment of the present invention. The event tracking system 260 sends the event reports 387_1 to the discrepancy detection system 380 in path 387.

Figure 5:
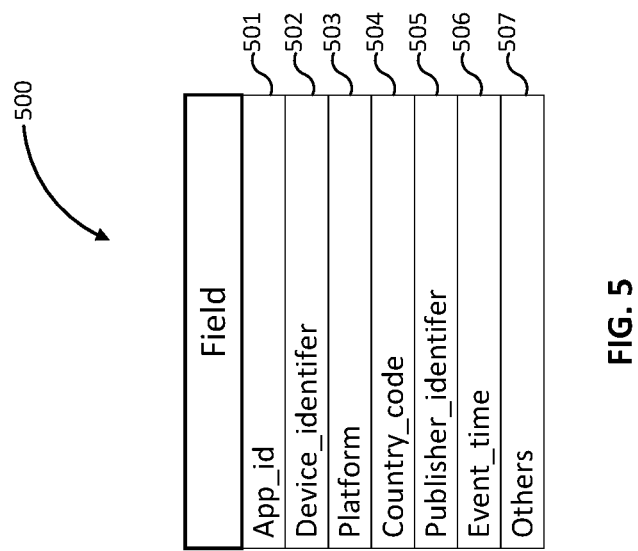
FIG. 5 shows possible data fields included in an event report.

FIG. 5 shows possible data fields included in an event report 500 from the event tracking system 260 in path 387 to the discrepancy detection system 380. The app_id 501 stores the app identifier, the device_identifier 502 stores the device identifier, The platform 503 stores the platform information such as Android or iOS, the country_code 504 stores the country code, the publisher_identifier 505 stores the publisher identifier, the event_time 506 stores the time of the event, and there can be other data in the event report stored in the Others 506.

Figure 6:
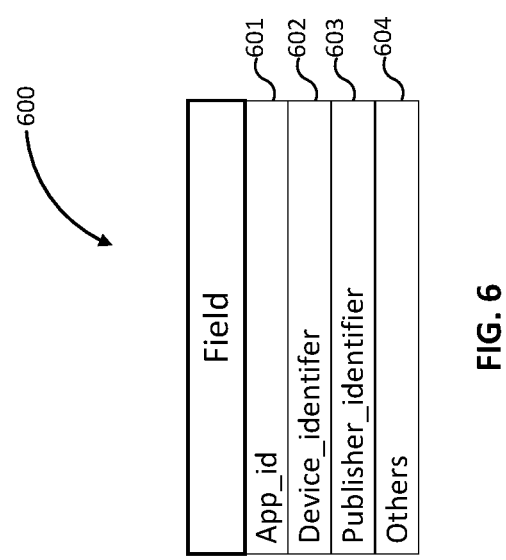
FIG. 6 shows possible data fields included in an event postback message.

Returning to FIG. 3B, the event postback message 381_3 may contain data that is sufficient enough to identify the device and the app that contributes to the event for the content publisher. FIG. 6 shows possible data fields in an event postback message 600 in accordance with one embodiment of this invention. The app_id 601 stores the app identifier, the device_identifier 602 stores the device_identifier, the publisher_identifier 603 stores the publisher_identifier, and other information may be stored in the others 604 field as well.

Returning to FIG. 3A, the discrepancy detection system 380 gets the event report from the event tracking system 260 in path 387, it gets the event postback message from the content publisher system 220 in path 381, and it gets the device identifiers for devices on which the content 280 is clicked or the app 272 is installed from the content publisher system 220 in path 381.

In one embodiment of this invention, the discrepancy detection system 380 may use the method 700 to identify any discrepancies in the event postback message.

Figure 7A:
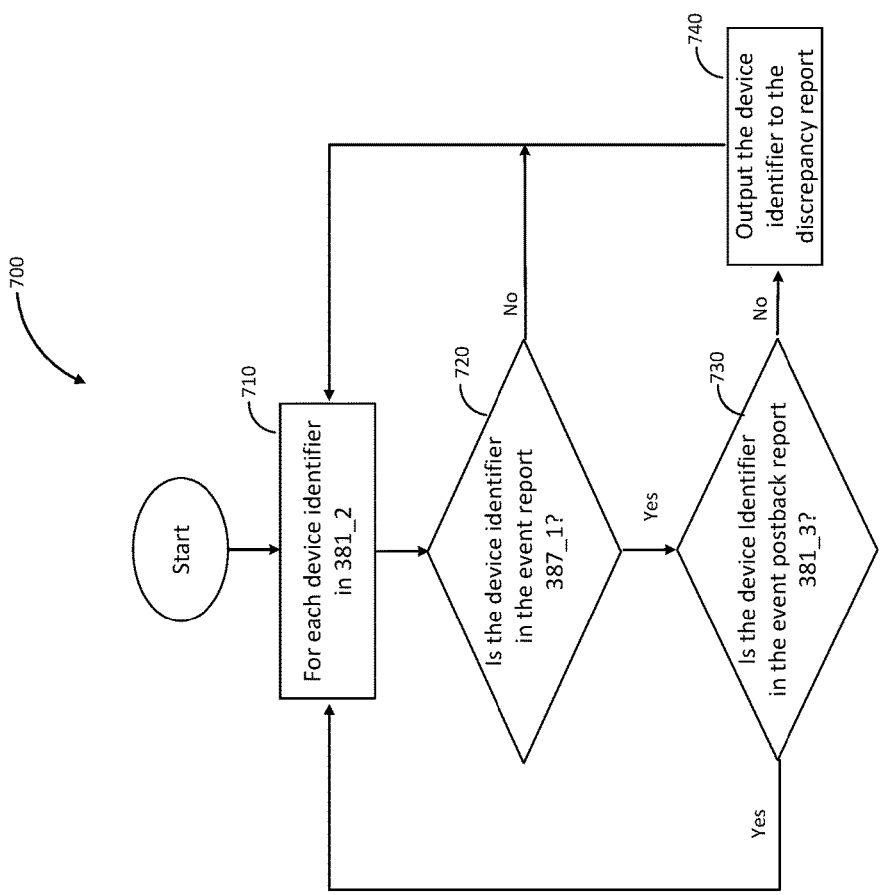
FIG. 7A shows a flow diagram of an exemplary computer-implemented method 700 for identifying the event discrepancy in accordance with an embodiment.

FIG. 7A shows a flow diagram of an exemplary computer-implemented method 700 for identifying the event discrepancy in accordance with an embodiment of the present invention. The steps shown in FIG. 7A may be performed by any suitable computer-executable code and/or computing system. In one embodiment, the steps shown in FIG. 7A may be performed by the discrepancy detection system 380.

As illustrated in FIG. 7A, the steps 710, 720, and 730 may be repeated multiple times. Step 710 comprises identifying one device identifier from 381_2 at a time. Step 720 is used to determine if the device identifier from step 710 can be found in the event report 387_1 that is received in path 387. If no device identifier is determined, the sequence repeats step 710 to look for another device identifier. If the device identifier does have an associated event in the event report 387_1, step 730 is used to determine whether the same device identifier is in the event postback message 381_3. If the condition is true, there is no discrepancy and the sequence returns to step 710 to look for another device identifier. If step 730 cannot find the said device identifier in the event postback message 381_3, a deduction is made that there may be a discrepancy, and the device identifier and associated information such as app identifier and publisher identifier are saved and included in the discrepancy report in step 740. This sequence may stop at this point, or it may continue to look for additional discrepancies until a stop condition has been reached.

Figure 7B:
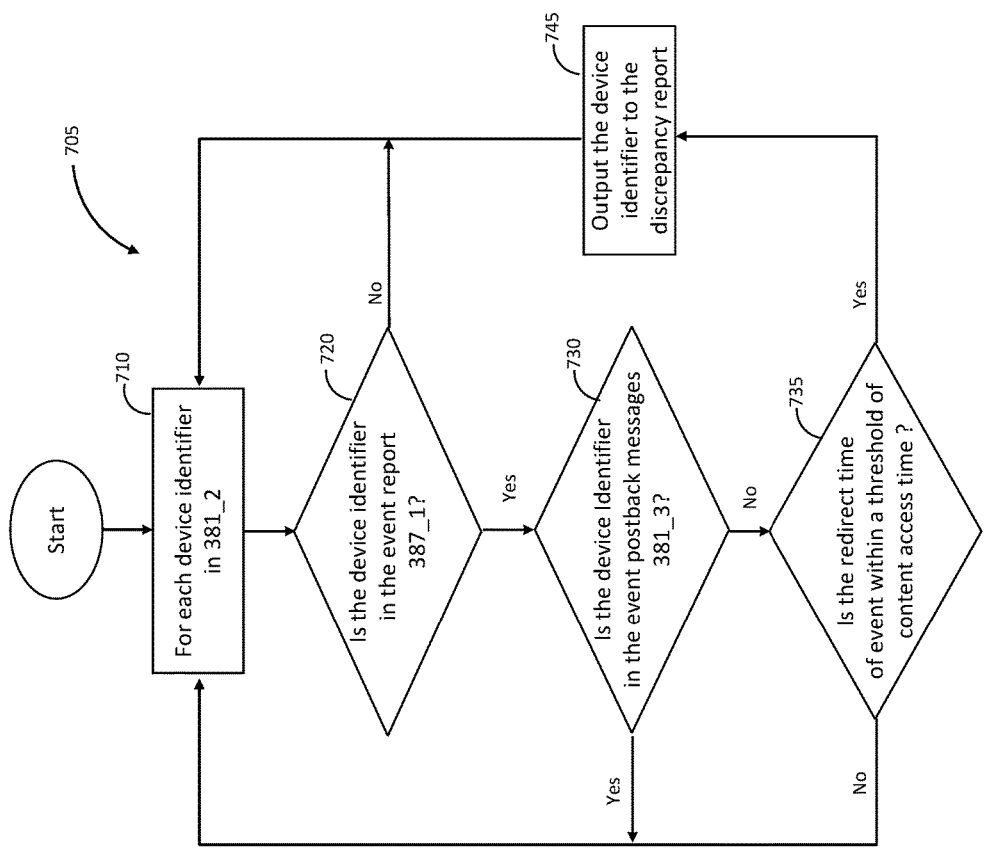
FIG. 7B shows a flow diagram of an exemplary computer-implemented method 705 for identifying the event discrepancy in accordance with an embodiment.

FIG. 7B shows a flow diagram of an exemplary computer-implemented method 705 for identifying the event discrepancy in accordance with an embodiment. The steps 710, 720, and 730 of the method 705 are similar to those of method 700 shown in FIG. A. In the embodiment illustrated in FIG. 7B, the discrepancy detection system 380 receives a timestamp for each device identifier in 381_2, the timestamp indicating a content access time t1 at which the client device having the device identifier accessed the content publishing system 220 via the tracking URL. The discrepancy detection system 380 also receives an event timestamp in each event report 387_1, the timestamp indicating a redirect time t2 at which the client device accessed the event tracking system 260 as a result of the client device getting redirected after accessing the content publishing system 220 via the tracking URL. The discrepancy detection system 380 checks in step 735 whether the redirect time t2 is within a threshold of the content access time t1. If the discrepancy detection system 380 determines that the difference between the redirect time t2 and the content access time t1 is within a threshold value, the discrepancy detection system 380 outputs the device identifier to the discrepancy report as shown in step 745. The discrepancy detection system 380 identifies the device identifier as being associated with a discrepancy since the client device is expected to access the event tracking system 260 via the redirect URL within a threshold time of the client device accessing the content publishing system 220 via the tracking URL. If the time difference between the redirect time t2 and the content access time t1 is within a threshold value, there is a strong likelihood that the event (e.g., install of an application downloaded by the client device) should have been attributed to the content publishing system 220 by the event tracking system 260.

Returning to FIG. 3C, in one embodiment, it may be desirable to have the event tracking system 260 provide event report for the content publisher system 220 only. In one embodiment of this invention, the publisher identifier of the content publisher system 220 can be appended to the URL in path 207 (see FIG. 2) before opening the URL connection to the event tracking system 260. In this example, the event tracking system 260 can track it is the content publisher system 220 who contributes to the event.

FIG. 2B shows an example where the publisher identifier is appended in accordance with one embodiment of this invention. The publisher media 210 running on client device 210 may append the publisher identifier to the end of the URL in path 207 and open the URL connection using the identifier-appended URL 207_2 to the event tracking system 260. In this example, the event tracking system 260 may record the publisher identifier and store it with the event report.

Returning to FIG. 4B, the content publisher linked by the URL 410 may append its publisher identifier to the end of URL 414. Table 1 shows an example of the URL 414 and the result after the publisher identifier is appended. The parameter end_publisher_id and its value (appisocial_int in this example of Table 1) are appended to the end of URL 414.

TABLE 1

| | URL |
|---|---|
| Before append | https://app.appsflyer.com/com.zplay.roguelifehk?af_prt=Mobvista&pid=mobvista_int&af_click_lookback=7d&c=zp_ygll_tw_mob1945962dba889f40&af_siteid=mob1945962dba889f40&clickid=58f624a3b980d20b0dd7c88c |
| After append | https://app.appsflyer.com/com.zplay.roguelifehk?af_prt=Mobvista&pid=mobvista_int&af_click_lookback=7d&c=zp_ygll_tw_mob1945962dba889f40&af_siteid=mob1945962dba889f40&clickid=58f624a3b980d20b0dd7c88c&end_publisher_id=appisocial_int |

In one embodiment, the discrepancy detection system 380 may use method 800 to identify the event discrepancy when the event tracking system 260 can provide the event report that only belongs to the content publisher system 220.

Figure 8:
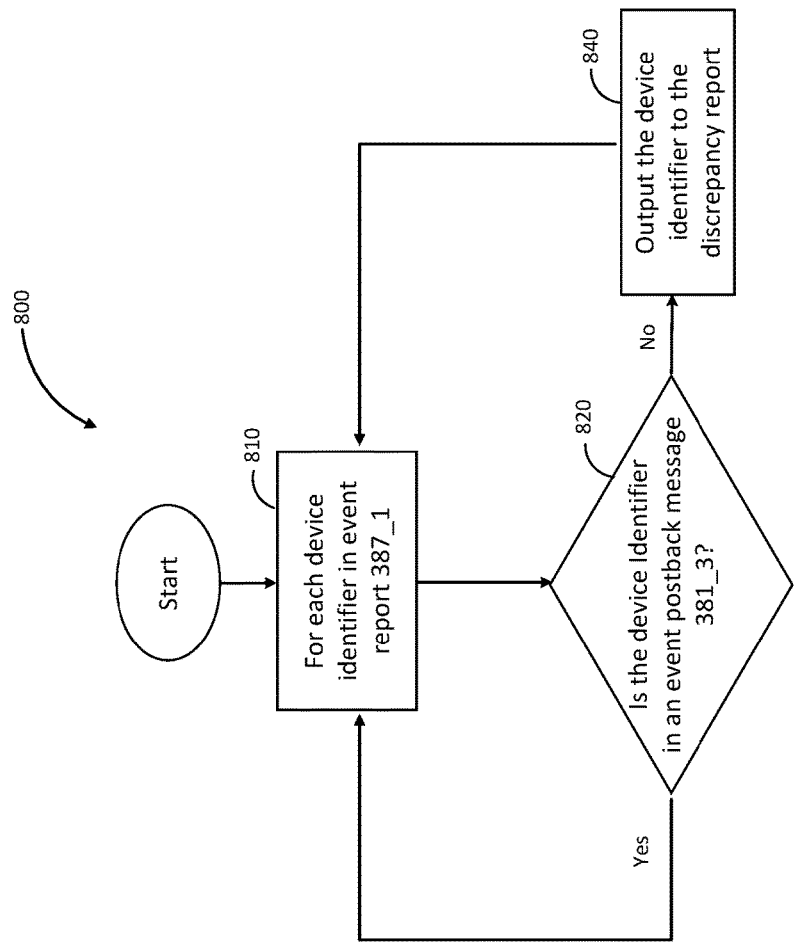
FIG. 8 shows a flow diagram of an exemplary computer-implemented method 800 for identifying the event discrepancy in accordance with an embodiment.

FIG. 8 shows a flow diagram of an exemplary computer-implemented method 800 for identifying the event discrepancy in accordance with an embodiment of the present invention. The steps shown in FIG. 8 may be performed by any suitable computer-executable code and/or computing system. In one embodiment, the steps shown in FIG. 8 may be performed by the discrepancy detection system 380.

As illustrated in FIG. 8, step 810 gets one device identifier from the event reports 387_1 at a time. Step 820 is used to determine if the device identifier from step 810 can be found in the event postback message 381_3. If the condition is true, there is no discrepancy and the sequence returns to step 810 to look for another device identifier. However, if step 820 cannot find the said device identifier in the event postback message 381_3, a deduction is made that there is a discrepancy, and the device identifier and associated information such as app identifier and publisher identifier are saved and included in the discrepancy report in step 840. This sequence may stop at this point, or it may continue to look for additional discrepancies until a stop condition has been reached.

Returning to FIG. 3A, the content tracking system 230(a) and the content tracking system 230(b) may send their copies of the event postback messages to the discrepancy detection system 380 in path 385 and 383 respectively. The discrepancy detection system 380 may use either method 700, 705, or 800 to find out the event discrepancy between the said content tracking system and the event tracking system 260. The content tracking system 230(a) and the content tracking system 230(b) may retrieve their discrepancy reports from the discrepancy detection system 380 in path 386 and 384 respectively.

The discrepancy detection system 380 may detect different types of discrepancy. The first type of discrepancy refers to device IDs that are found in the event report received from the event tracking system 260 but are missing from the event postback messages that are received by the content publishing system 220. This discrepancy identifies event postback messages that may have been removed due to coding errors, configuration errors, or due to malicious intent by one of the systems that routed the event postback messages to the content publishing system 220.

The discrepancy detection system 380 may detect another type of discrepancy in which the event reported by the event tracking system 260 associates the event with another content publishing system 220(b) even though there is a high likelihood that the event was performed in response to a user accessing the tracking URL of the content provided by a content publishing system 220(a). In this embodiment, the events generated by the client devices and sent to the event tracking system 260 include a timestamp t1 of the time at which the client device accessed the event tracking system using a redirect URL that was provided to the client device as a result of the client device accessing the tracking URL when the user clicks on the content on the client device. The discrepancy detection system 380 receives these timestamps associated with the events as part of the event report provided by the event tracking system 260. The content publishing system 220 also provides a timestamp t2 of the time when the client device accessed the content publishing system via the tracking URL of the content item. The discrepancy detection system 380 receives the time stamp information from both the content publishing system 220 and the event tracking system 260.

Figure 2A:
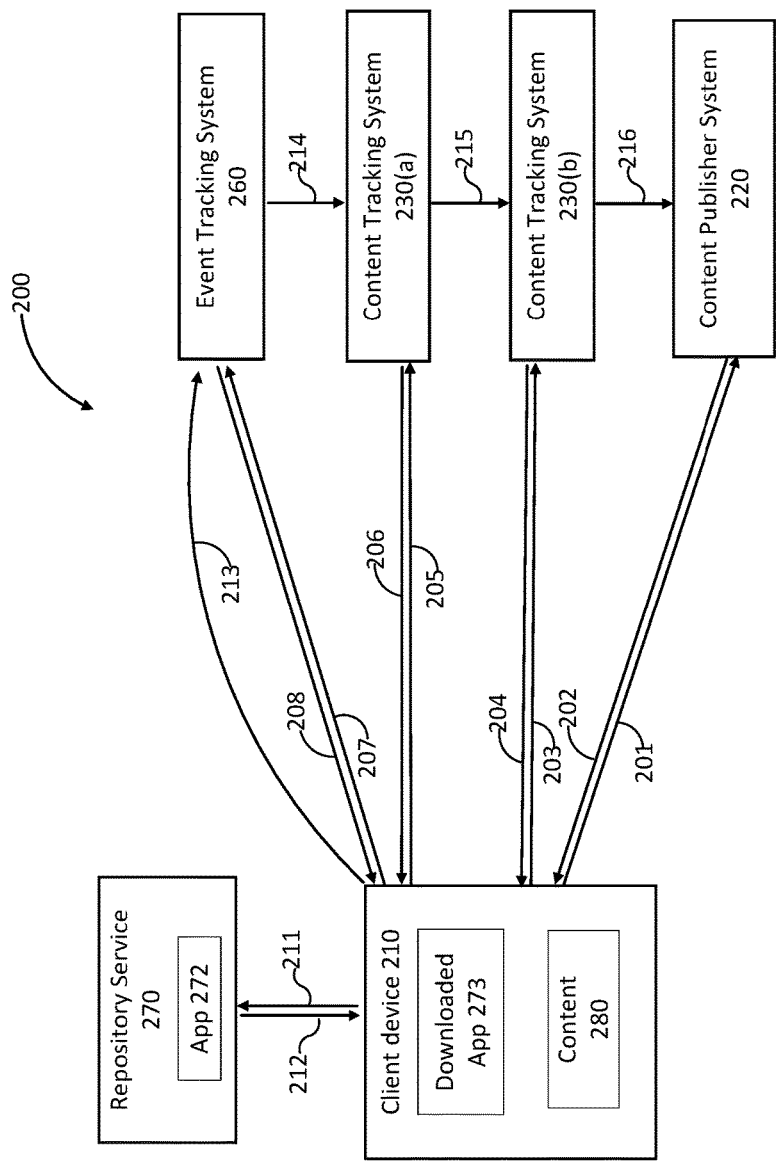
FIG. 2A schematically illustrates mobile event tracking, according to an embodiment.

The event tracking system 260 receives information from a client device describing an event such as a launch of an application performed using a client device as shown by 213 in FIG. 2A. The event tracking system 260 identifies a time at which the same client device accessed the event tracking system 260 via a redirect URL as shown by 207 in FIG. 2A and associates the event with that redirect time. If the discrepancy detection system 380 identifies an event in an event postback message that has a device identifier matching a device identifier in an event report received from the content publishing system but the time difference between the timestamp t1 at which the client device accessed the event tracking system via the redirect URL and the timestamp t2 at which the client device accessed the content publishing system 220 via the tracking URL is greater than a threshold value, the discrepancy detection system 380 reports the device identifier as being associated with a discrepancy. This is so because the amount of time taken for the client device to access a redirect URL received after accessing the content publishing system 220 via a tracking URL is typically within a known threshold value, even if the client device accesses a sequence of redirect URLs received as a result of accessing the content publishing system 220 via the tracking URL.

Additional Configuration Considerations

In some embodiments, a content item is a sponsored content item. For example, a content provider associated with the repository service 270 may sponsor the content item to attract users to the repository service 270. For example, an application developer that provides an application 272 for download via the repository service 270 may sponsor a content item for publishing via the content publishing system to attract users for downloading the application. The sponsored content item may also be referred to as an advertisement and the content provider that provides content for the repository service 270 may be referred to as an advertiser. The repository service may be also referred to as a third party system or a third party website.

The event tracking system may also be referred to as an attribution provider that provides information describing which content publisher is attributed to which event. A content tracking system may also be referred to as an ad marketer system. An event report may also be referred to as an attribution report. An event postback message may also be referred to as an attribution postback report. The repository service may be an app store or an application store or a website. A content ID may also be referred to as an ad ID.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for identifying discrepancies associated with an event tracking system, the computer-implemented method comprising:
   receiving, from a content publisher system, information associated with a content item provided by the content publisher system to client devices, the information comprising:
      a tracking uniform resource locator (URL) associated with the content item, wherein the content publisher system sends the tracking URL along with the content item to client devices, and
      a set of device identifiers, each device identifier identifying a client device that interacted with the content publisher system via the tracking URL;
   identifying an event tracking system associated with the content item based on the tracking URL;
   sending, to the event tracking system, a request for information describing events representing user interactions of a particular type performed using client devices;
   responsive to sending the request for information to the event tracking system, receiving, from the event tracking system, an event report comprising a second set of device identifiers, each device identifier of the second set identifying a client device that performed a user interaction of the particular type;
   matching the first set of device identifiers with the second set of device identifier to determine a matching set of device identifiers, wherein each device identifier of the matching set identifies a client device that performed the user interaction of the particular type responsive to interacting with the content publisher system via the tracking URL associated with the content item;
   receiving from the content publisher system, information describing a set of event postback messages received by the content publisher system from the event tracking system, the information comprising a third set of device identifiers identified in the set of event postback messages received by the content publisher system;
   identifying a device identifier present in the matching set of device identifiers but missing in the third set of device identifiers; and
   sending information describing the identified device identifier as a discrepancy report.

2. The computer-implemented method of claim 1, wherein identifying an event tracking system associated with the content item comprises:
   determining a sequence of redirect URLs traversed by a client device responsive to the client device accessing the tracking URL associated with the content item, wherein the last redirect URL in the sequence of redirect URL comprises an address of the repository service; and
   determining the event tracking system based on one of the redirect URL.

3. The computer-implemented method of claim 2, wherein determining the event tracking system based on one of the redirect URL comprises:
   identifying the redirect URL before the last redirect URL; and
   identifying the event tracking system based on the redirect URL before the last redirect URL.

4. The computer-implemented method of claim 2, wherein determining the event tracking system based on one of the redirect URL comprises:
   retrieving one or more predefined strings, each string associated with a known event tracking system;
   comparing one or more redirect URLs from the sequence of URLs with the one or more predefined strings; and
   responsive to finding a match between a particular redirect URL and a particular predefined string, determining that the event tracking system for the content item is a particular known event tracking system associated with the particular predefined string.

5. The computer-implemented method of claim 1, wherein the information associated with a content item received from the content publishing system comprises a timestamp associated with each device identifier, the timestamp indicating the time at which the client device interacted with the content publisher system via the tracking URL and the event report received from the event tracking system comprises a timestamp indicating the time at which the client device accessed the event tracking system via a redirect URL responsive to the client device accessing the tracking URL, the method further comprising:
   identifying a second device identifier present in the matching set of device identifiers but missing in the third set of device identifiers, wherein a first timestamp value associated with the second device identifier is received from the content publisher system and a second timestamp value associated with the second device identifier is received from the event tracking system;
   determining that the time difference between the first timestamp value and the second timestamp value is within a threshold value; and
   sending information describing the second identified device identifier as a discrepancy report.

6. The computer-implemented method of claim 1, wherein the information associated with a content item received from the content publishing system comprises a timestamp associated with each device identifier, the timestamp indicating the time at which the client device interacted with the content publisher system via the tracking URL and the event report received from the event tracking system comprises a timestamp indicating the time at which the client device accessed the event tracking system via a redirect URL responsive to the client device accessing the tracking URL, the method further comprising:
   identifying a second device identifier present in both: the matching set of device identifiers and the third set of device identifiers, wherein a first timestamp value associated with the second device identifier is received from the content publisher system and a second timestamp value associated with the second device identifier is received from the event tracking system;

determining that the time difference between the first timestamp value and the second timestamp value is more than a threshold value; and sending information describing the second identified device identifier as a discrepancy report.

7. The computer-implemented method of claim 1, wherein the user interaction of the particular type associated with an event is a launch of an application downloaded to the client device from the repository service.

8. The computer-implemented method of claim 1, wherein the user interaction of the particular type associated with an event is an install of an application downloaded to the client device from the repository service.

9. The computer-implemented method of claim 1, wherein the user interaction of the particular type associated with an event is a transaction performed using an executable application downloaded to the client device from the repository service.

10. The computer-implemented method of claim 1, wherein the request for information sent to the event tracking system includes the scope of the event report by specifying a criteria comprising one or more of: an identifier of the content publisher system, an application identifier, a location, or a time duration, wherein the event tracking system determines the second set of device identifiers based on the specified criteria.

11. The computer-implemented method of claim 1, wherein an event postback message received by the content publisher system from the event tracking system is routed via one or more content tracking systems, the method further comprising:

receiving from a content tracking system, information describing event postback messages sent by the content tracking system to the content publisher system, the information comprising a third set of device identifiers identified in the event postback messages sent by the content tracking system; and identifying a second device identifier that is present in the matching set of device identifiers but missing in the third set of device identifiers; and sending information describing the second device identifier as a discrepancy report.

12. The computer-implemented method of claim 1, wherein the content item is a first content item and the event tracking system is a first event tracking system, the computer-implemented method further comprising:

receiving, from the content publisher system, information associated with a second content item provided by the content publisher system to client devices, the information comprising a second tracking URL associated with the second content item;

identifying a second event tracking system associated with the second content item based on the second tracking URL;

receiving, from the second event tracking system, a second event report;

receiving from the content publisher system, information describing a second set of event postback messages received by the content publisher system from the second event tracking system; and determining discrepancies based on the event postback messages received by the content publisher system from the second event tracking system.

13. The computer-implemented method of claim 1, further comprising:

appending a publisher_identifier identifying the content publisher system to the tracking URL, wherein the event tracking system uses the publisher identifier for determining the event report.

14. A non-transitory computer readable storage medium storing executable instructions that when executed by a computer processor cause the computer processor to perform:

receiving, from a content publisher system, information associated with a content item provided by the content publisher system to client devices, the information comprising:

a tracking uniform resource locator (URL) associated with the content item, wherein the content publisher system sends the tracking URL along with the content item to client devices, and a set of device identifiers, each device identifier identifying a client device that interacted with the content publisher system via the tracking URL;

identifying an event tracking system associated with the content item based on the tracking URL;

sending, to the event tracking system, a request for information describing events representing user interactions of a particular type performed using client devices;

responsive to sending the request for information to the event tracking system, receiving, from the event tracking system, an event report comprising a second set of device identifiers, each device identifier of the second set identifying a client device that performed a user interaction of the particular type;

matching the first set of device identifiers with the second set of device identifier to determine a matching set of device identifiers, wherein each device identifier of the matching set identifies a client device that performed the user interaction of the particular type responsive to interacting with the content publisher system via the tracking URL associated with the content item;

receiving from the content publisher system, information describing a set of event postback messages received by the content publisher system from the event tracking system, the information comprising a third set of device identifiers identified in the set of event postback messages received by the content publisher system;

identifying a device identifier present in the matching set of device identifiers but missing in the third set of device identifiers; and sending information describing the identified device identifier as a discrepancy report.

15. The non-transitory computer readable storage medium of claim 14, wherein instructions for identifying an event tracking system associated with the content item comprise instructions for:

determining a sequence of redirect URLs traversed by a client device responsive to the client device accessing the tracking URL associated with the content item, wherein the last redirect URL in the sequence of redirect URL comprises an address of the repository service; and determining the event tracking system based on one of the redirect URL.

16. The non-transitory computer readable storage medium of claim 15, wherein instructions for determining the event tracking system based on one of the redirect URL comprise instructions for:
   identifying the redirect URL before the last redirect URL; and
   identifying the event tracking system based on the redirect URL before the last redirect URL.

17. The non-transitory computer readable storage medium of claim 15, wherein instructions for determining the event tracking system based on one of the redirect URL comprise instructions for:
   retrieving one or more predefined strings, each string associated with a known event tracking system;
   comparing one or more redirect URLs from the sequence of URLs with the one or more predefined strings; and
   responsive to finding a match between a particular redirect URL and a particular predefined string, determining that the event tracking system for the content item is a particular known event tracking system associated with the particular predefined string.

18. The non-transitory computer readable storage medium of claim 14, wherein the information associated with a content item received from the content publishing system comprises a timestamp associated with each device identifier, the timestamp indicating the time at which the client device interacted with the content publisher system via the tracking URL and the event report received from the event tracking system comprises a timestamp indicating the time at which the client device accessed the event tracking system via a redirect URL responsive to the client device accessing the tracking URL, wherein the instructions further cause the computer processor to perform:
   identifying a second device identifier present in both: the matching set of device identifiers and the third set of device identifiers, wherein a first timestamp value associated with the second device identifier is received from the content publisher system and a second timestamp value associated with the second device identifier is received from the event tracking system;
   determining that the time difference between the first timestamp value and the second timestamp value is more than a threshold; and
   sending information describing the second identified device identifier as a discrepancy in the event postback messages.

19. A computer system comprising:
   one or more processors; and
   a non-transitory computer readable storage medium storing executable instructions that when executed by a computer processor cause the computer processor to perform:
   receiving, from a content publisher system, information associated with a content item provided by the content publisher system to client devices, the information comprising:
      a tracking uniform resource locator (URL) associated with the content item, wherein the content publisher system sends the tracking URL along with the content item to client devices, and
      a set of device identifiers, each device identifier identifying a client device that interacted with the content publisher system via the tracking URL;
   identifying an event tracking system associated with the content item based on the tracking URL;
   sending, to the event tracking system, a request for information describing events representing user interactions of a particular type performed using client devices;
   responsive to sending the request for information to the event tracking system, receiving, from the event tracking system, an event report comprising a second set of device identifiers, each device identifier of the second set identifying a client device that performed a user interaction of the particular type;
   matching the first set of device identifiers with the second set of device identifier to determine a matching set of device identifiers, wherein each device identifier of the matching set identifies a client device that performed the user interaction of the particular type responsive to interacting with the content publisher system via the tracking URL associated with the content item;
   receiving from the content publisher system, information describing a set of event postback messages received by the content publisher system from the event tracking system, the information comprising a third set of device identifiers identified in the set of event postback messages received by the content publisher system;
   identifying a device identifier present in the matching set of device identifiers but missing in the third set of device identifiers; and
   sending information describing the identified device identifier as a discrepancy report.

20. The computer system of claim 19, wherein the instructions for identifying an event tracking system associated with the content item comprise instructions for:
   determining a sequence of redirect URLs traversed by a client device responsive to the client device accessing the tracking URL associated with the content item, wherein the last redirect URL in the sequence of redirect URL comprises an address of the repository service; and
   determining the event tracking system based on one of the redirect URL.

* * * * *